United States Patent [19]

Wilner

[11] Patent Number: 4,825,335
[45] Date of Patent: Apr. 25, 1989

[54] DIFFERENTIAL CAPACITIVE TRANSDUCER AND METHOD OF MAKING

[75] Inventor: Leslie B. Wilner, Palo Alto, Calif.

[73] Assignee: Endevco Corporation, San Juan Capistrano, Calif.

[21] Appl. No.: 167,936

[22] Filed: Mar. 14, 1988

[51] Int. Cl.$^4$ .......................... H01G 7/00; G01L 1/22
[52] U.S. Cl. ...................................... 361/283; 73/718; 29/25.42; 338/4
[58] Field of Search ...................... 338/4; 73/718, 724; 29/25.42; 361/283

[56] References Cited

U.S. PATENT DOCUMENTS

| 3,858,097 | 12/1974 | Polye | 361/283 |
| 4,420,790 | 12/1983 | Golke et al. | 73/718 X |
| 4,530,029 | 7/1985 | Beristain | 29/25.42 X |
| 4,574,327 | 3/1986 | Wilner | 361/283 |

*Primary Examiner*—Donald Griffin
*Attorney, Agent, or Firm*—Robert C. Smith

[57] ABSTRACT

A differential variable capacitance acceleration sensor includes a sandwich structure having three stacked plates of silicon with the center plate mounted such that its center portion is enabled to move in a sealed cavity with each side thereof moving toward and away from a fixed cooperating plate forming the opposite side of a capacitive circuit. The center portion or mass of the center plate is suspended from its rim by means of a large number of integral fingers extending from the rim to the top and bottom surfaces of the center portion. This center mass includes a number of through holes to permit the passage of air from one side to the other and may also include grooves to aid in the flow of air. The fixed top plate or lid and the base also have, or may have, grooves to assist in the passage of air. An alternative embodiment includes a smaller number of more compliant fingers to provide a more compliant structure. A number of spaced stops are provided in the lid and base to overcome electrostatic and pneumatic latch up. The method of forming the individual parts is also taught.

25 Claims, 12 Drawing Sheets

DIFFERENTIAL CAPACITIVE TRANSDUCER AND METHOD OF MAKING

This invention relates to a capacitive transducer and method of manufacture and more particularly to a differential capacitive acceleration transducer or sensor which utilizes a layered sandwich-type structure wherein a movable plate in a central layer is mounted to move in piston-like fashion in a cavity toward and away from a pair of outer layers consisting of fixed plates to provide an exceptionally large area of movement of the movable plate and wherein the movable plate is suspended in a differential manner from supports in two separate planes.

A capacitive transducer of the general type here under consideration is described in U.S. Pat. No. 4,574,327. As described in that patent the movable plate is suspended from a rim on a single comparatively thin membrane along a plane approximately midway between the opposite surfaces of the movable plate. The movable plate utilizes a plurality of spaced holes or passages for movement of fluid therethrough. The fluid (air) moves through the passages as the plate moves back and forth. Grooves on the surfaces of the plate direct the flow of fluid toward and away from the passages. Also taught in U.S. Pat. No. 4,574,327 is the use of spots of glass as stops over the movable plate. In the event of an overload the stops prevent electrical shorting of the plates. The spots, in addition, prevent two forms of latch-up in an overload. In very sensitive capacitive sensors, the attractive force of the electrical bias or carrier will exceed the spring force of the membrane mounting the movable piston at some proximity in the movement of the piston-like plate toward the fixed plate. Therefore, the plates latch together.

Another latch-up problem can take the form of pneumatic latch-up. That is, as flat plates are brought into very close proximity with each other, the flow resistance into the space between them becomes very high. It may take a long time (several seconds) for gas to re-enter this space in a sensitive capacitive sensor, and allow the moving plate to return to its normal position after an overload. The stop spots invention spaced over the surface of the plate keep the space open between the two plates to allow gas flow and rapid recovery.

An additional feature taught in the above patent is the use of small silicon knobs, ridges, bars or other protuberances on the core which are jammed into an aluminum film on an opposing part of the sandwich, which has the effect that the knobs are held in contact by elastic deformation of the underlying material which makes for a stable connection between the parts. Finally, in the processing of the capacitor plate of the invention, highly sensitive capacitive sensors of very small size are produced, in accordance herewith, with uniform thin flexures by means of a diffused etch stop.

In considering generally the conditions for producing a silicon capacitive sensor in accordance with the present invention, it is important to realize that the resulting instrument must provide a capacitor gap which is controlled within ±10%, and the residual membrane thickness must be controllable within ±8%. The neutral axis of the membrane or membranes must be near the midplane of the wafer. In addition, the throughholes and channels below the suspending spring elements must not have fragile overhanging material. The stop spots must be insulated to withstand anodic bonding voltages, and be within 0.6 and 1.0 microns in thickness for a device with a capacitor gap of 2 to 4 microns. Finally, the bonding rims must be flat and smooth for anodic bonding, and no photolithography is allowed after the membranes are revealed or developed.

The fixed plates may be principally silicon, with inlays of Pyrex or equivalent borosilicate glass to provide insulating, low capacitance bonds between layers. One procedure for making such composites of Pyrex and silicon is to etch into the silicon recesses slightly deeper than the desired thickness of Pyrex inlay. Pyrex frit is then deposited on the silicon by sedimentation, then fused to form a solid layer of glass with a thickness greater than the depth recesses.

The surface of the wafer is then ground and polished to remove the Pyrex from the undisturbed surface of the silicon to produce a flat, smooth surface on the Pyrex in the recesses. The base, which is the fixed plate of the capacitor, is coated with a thin aluminum film, which is patterned photolithographically to provide convenient connections to the fixed plates and the central layer with the movable plate.

The Applicant has determined that some significant advantages will result from providing a variable capacitive acceleration sensor in which the three insulated layers are incorporated into a differential capacitive device with two measured capacitor gaps, one increasing, one decreasing, in response to a given input. In the differential arrangement the movable mass is suspended from both top and bottom edges on leaf springs which are atomically continuous with the mass. In the course of manufacturing the device, portions of the surface layers are given a heavy doping of boron at the locations of the suspending members. This doping tends to be uneven through the thickness of the spring, creating a spring bias, which is apparent as a curl if the spring is freed. An advantage of the differential arrangement is that the spring bias tends to be equalized or cancelled since the suspension is made up of two patterns of springs, one near each surface of the wafer, which patterns are as nearly identical as possible.

The above described suspension system affords a performance benefit as contrasted with the device described in U.S. Pat. No. 4,574,327 from having a smaller unsupported span for the fixed plates of the capacitor.

The present invention also provides a significant economic advantage since it makes it possible to realize more transducer units (dice) from a single silicon wafer.

A still further advantage resides in the provision of gas flow channels in the fixed plates of the structure communicating with the throughholes in the movable mass, which makes it easier for some applications to use channel dimensions to control the damping of the devices. In the above patent the channels were formed continuous with the throughholes in the movable mass which is also a viable construction in my differential capacitive device and may be preferred in some instances.

With the foregoing advantages in view, this invention will now be described in more detail and other objects and advantages hereof will be apparent from the following description, the accompanying drawings, and the appended claims.

In the drawings:

FIGS. 14a–14j are fragmentary sectional drawings showing the processing sequences for producing the base of FIGS. 7 and 8.

Figure 1:
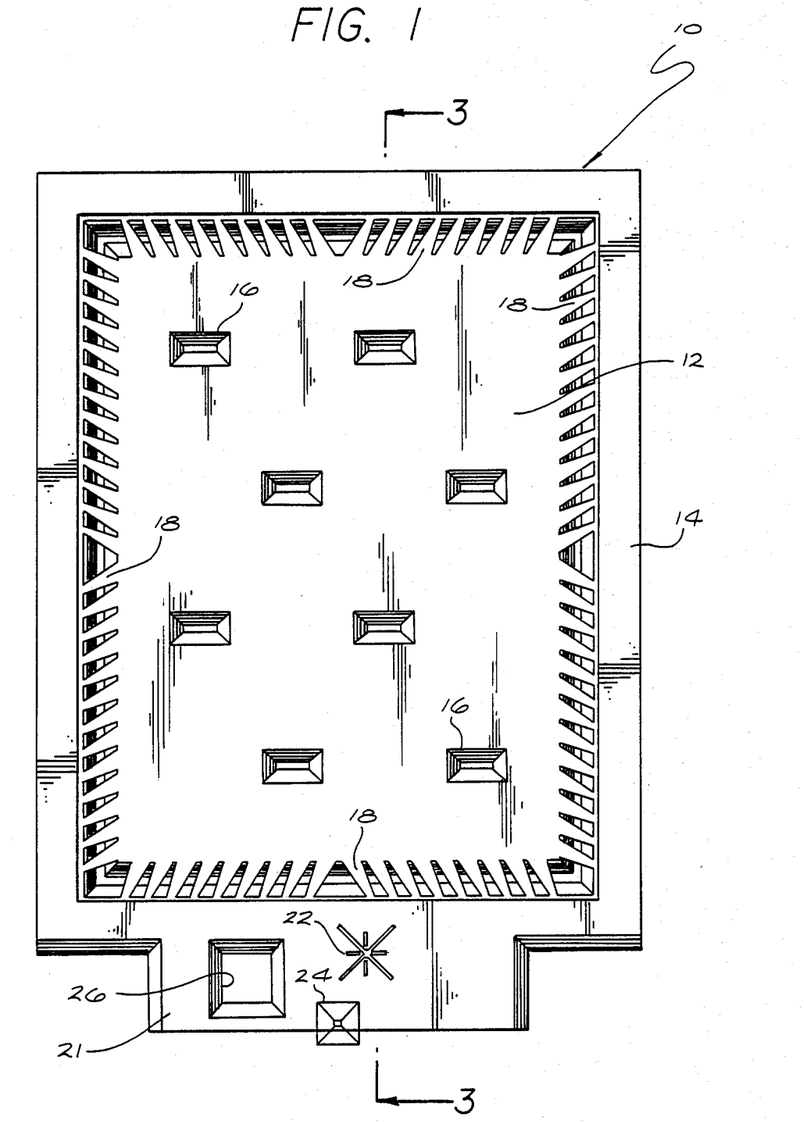
FIG. 1 is a plan view of one side of the movable capacitor plate of the invention which forms the central portion of the sandwich structure.
Figure 2:
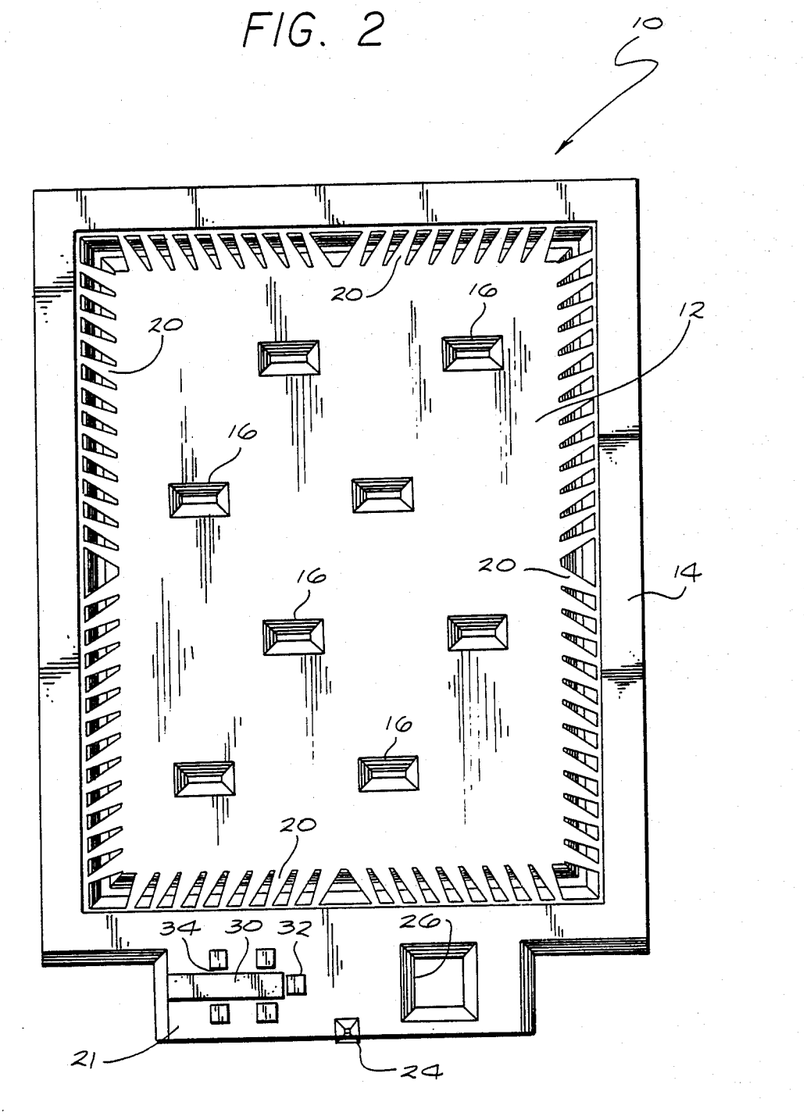
FIG. 2 is a plan view of the opposite side of the plate of FIG. 1.
Figures 3, 6, 8:
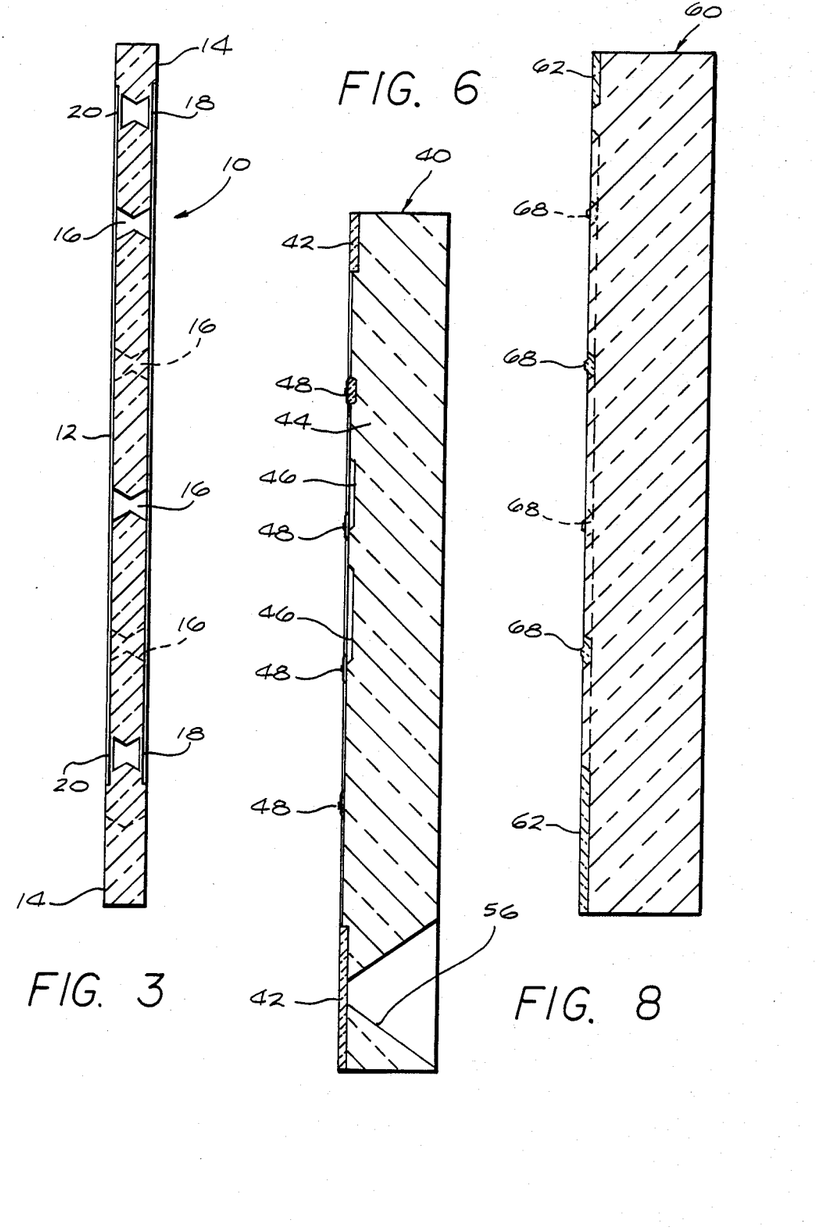
FIG. 3 is a cross sectional view taken along line 3—3 of FIG. 1.
FIG. 6 is a cross sectional view taken along line 6—6 of FIG. 4.
FIG. 8 is a cross sectional view taken along line 8—8 of FIG. 7.

Referring to the drawings in which like reference characters refer to like parts throughout the several views thereof, FIG. 1 shows a plan view of the upper side of the movable central capacitor plate or core of the invention which plate is placed between the upper and lower fixed plates to form a sandwich structure for use as an ultrasensitive capacitive transducer. FIG. 2 is a plan view of the bottom side of the same central capacitor plate. FIG. 3 is a sectional view taken through plate 10 along line 3—3 of FIG. 1. Capacitor plate 10 includes a central movable plate portion or mass 12, movable in piston-like manner normal to the plane of the paper on which FIG. 1 is shown. The central movable plate portion 12 is attached to a rim portion 14 by means of a large number of spaced fingers 18 extending from rim 14 all around the periphery of the central section 12. Viewed from the bottom side in FIG. 2, another large group of fingers 20 extend from rim 14 to the bottom edge of central portion 12. In the sectional drawing, FIG. 3, it will be observed that the central portion 12 is, in effect, suspended from edge portion 14 by means of the fingers 18 and 20. Also visible in this view are a number of the throughholes 16. These throughholes are passages 16 which are spaced over the surface of the movable plate 12 and allow the movement of air in the sandwich structure of the capacitive transducer from the bottom surface of plate 12 to the top surface thereof and vice versa.

The flexure fingers 18 and 20 are angled and tapered across the opening between the central mass 12 and the rim 14. These fingers must be angled sufficiently to insure undercutting by the etch. They are tapered to increase their participation in the moving capacitor plate. Most of the area at the inner end is solid, to appear as capacitor plate; most of the area at the rim end is open for good access to etchant. With the inner end stiffer, the bending is shifted outward, and the inner end appears more nearly to move with the central mass 12.

Member 10 is initially formed somewhat larger than shown in FIG. 1 and includes an extended portion 21 having a star-shaped centering target 22 which is used in the course of assembly as well as a tapered hole 24 which is also used for aligning the layers of the sandwich construction. The item 26 shown in FIGS. 1 and 2 is a hole representing removal of excess material.

On the bottom side of member 10 (FIG. 2) the extension portion 21 shows a series of spaced squares and rectangles 30, 32 which are holes or depressions which extend below the surface of the rim 14 leaving narrow bars 34 of semi-conducting silicon material which are contiguous with rim 14.

Figure 4:
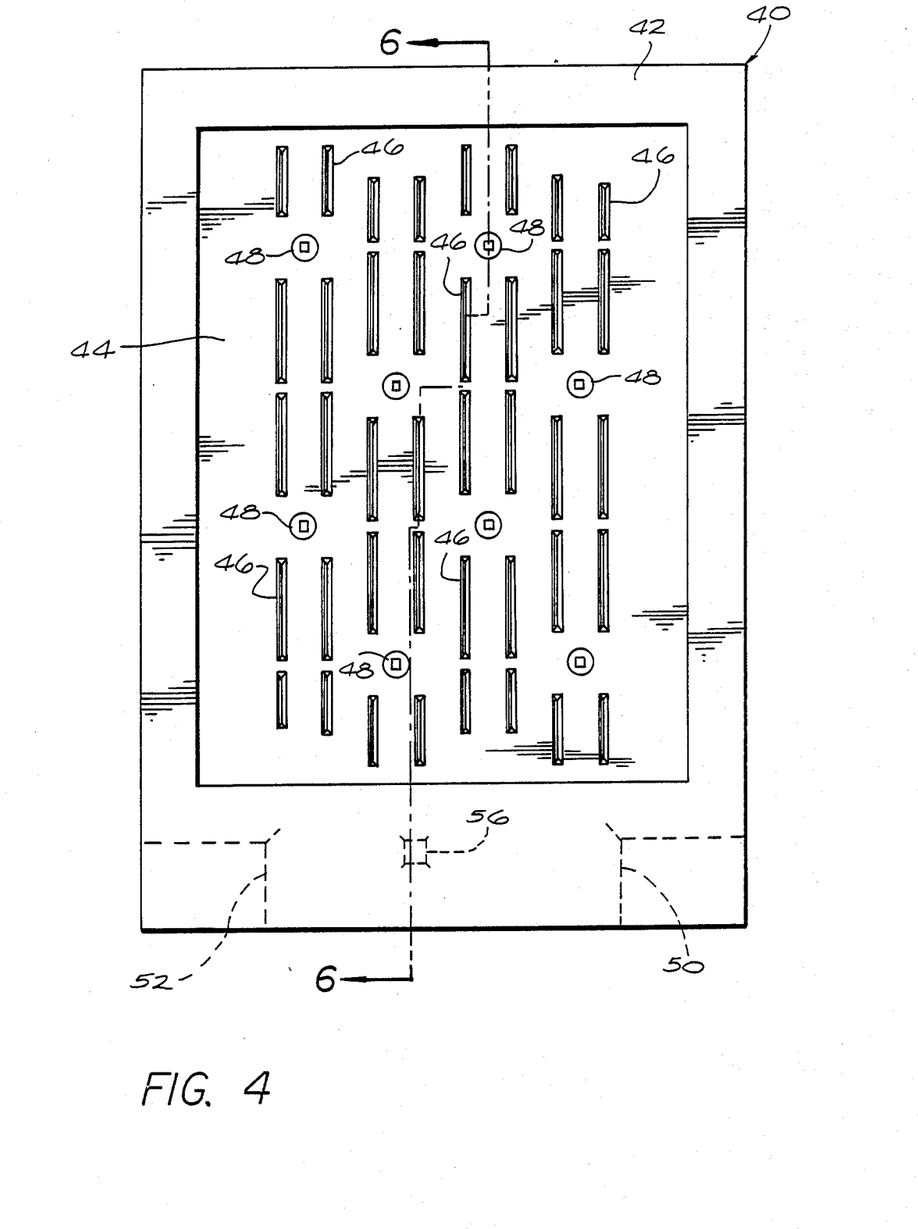
FIG. 4 is a plan view of the bottom surface of the upper fixed plate or lid.

FIG. 4 is a plan view of the bottom surface of the upper fixed plate or lid 40 of the transducer. This surface faces the surface of the movable plate shown on FIG. 1. A rim 42 is formed of an inlaid Pyrex insulating layer extending a significant distance (such as 1.3 mil) toward the center of the plate so that rim 14 of plate 10 makes contact with rim 42 only and not with the center part 44 of lid 40 which is of silicon. The center portion 44 of plate 40 which is a capacitor plate facing central portion 12 of plate 10 includes a large member of grooves 46 which are discrete rectangular trenches for which dimensional control can be quite precise. The capacitor gaps are recessed about equally into both sides of the central plate 10, and air can flow from groove to groove in these gaps. Interspersed among the grooves are a number of stop spots 48 which are Pyrex inlays. In the oxidation of the outer layers the Pyrex mounds up above the original surface. The contact points on the central plate 10 are oxide coated to prevent their anodically bonding to the Pyrex spots 48. Alternatively, the stop spots may be formed on both sides of the movable mass 12 with corresponding insulating layers on the surfaces 44 and 64 provided by a ½ micron layer of silicon dioxide.

Figure 5:
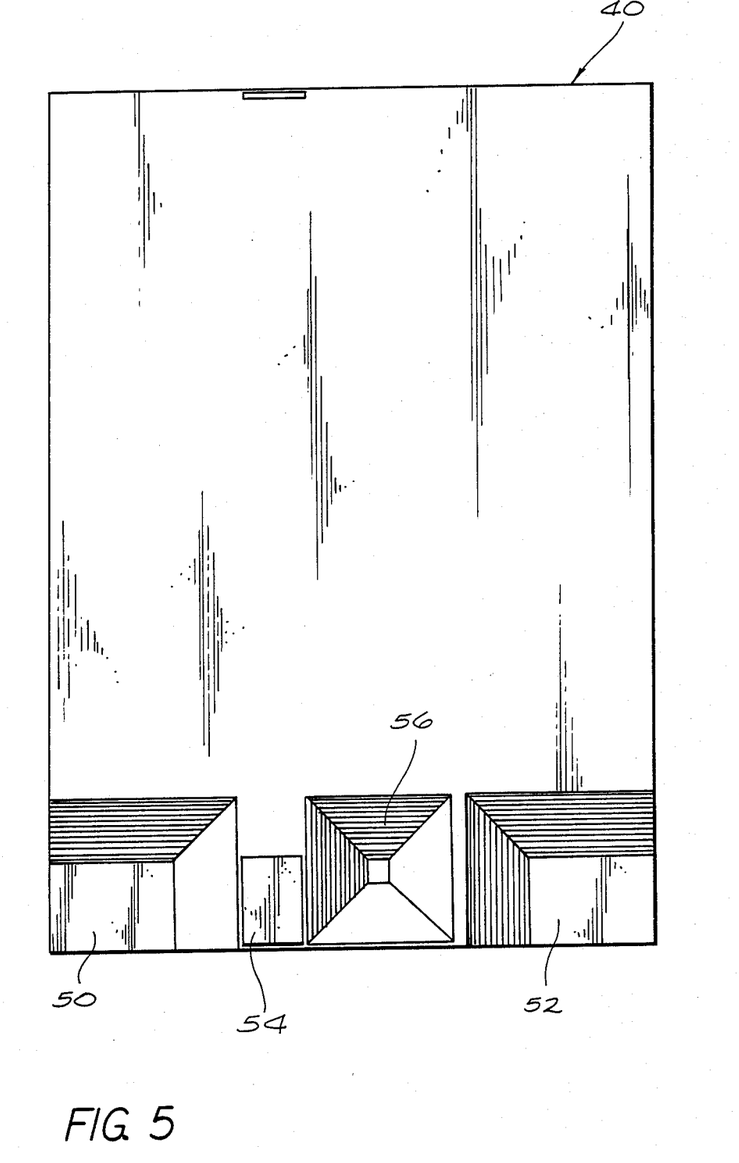
FIG. 5 is a plan view of the top surface of the lid.

FIG. 5 is a view of upper fixed plate 40 from the top or outside. This view shows that corner portions 50 and 52 are etched through the thickness of the silicon layer down to the Pyrex layer of rim 42. Adjacent opening 50 is an aluminum contact 54 which is the electrical connection to plate 40 which is one plate of the differential capacitor. A tapered hole 56, which also is etched through the silicon to the Pyrex layer provides a sight hole for viewing target 22 on the edge of movable plate 10 for purposes of alignment. The capacitors are formed as a large number of dice on a single wafer of much larger size and, after fabrication, are cut apart.

FIG. 6 is a sectional view taken along line 6—6 of FIG. 4. This view shows the tapered viewing hole 56 which extends through the silicon to the Pyrex layer of rim 42. Also shown are one of the grooves 46 and one of the Pyrex stop spots 48 which extend slightly above the surface of center portion 44 and above the level of rim 42 such that they limit the movement of the movable central mass 12. The stop spots take up a large part of the capacitor gap between the central mass 12 and center portion 44 of lid 40. Fullscale travel of the movable central mass 12 is about 30 percent of the capacitor gap between plate 10 and the lid 40.

Figure 7:
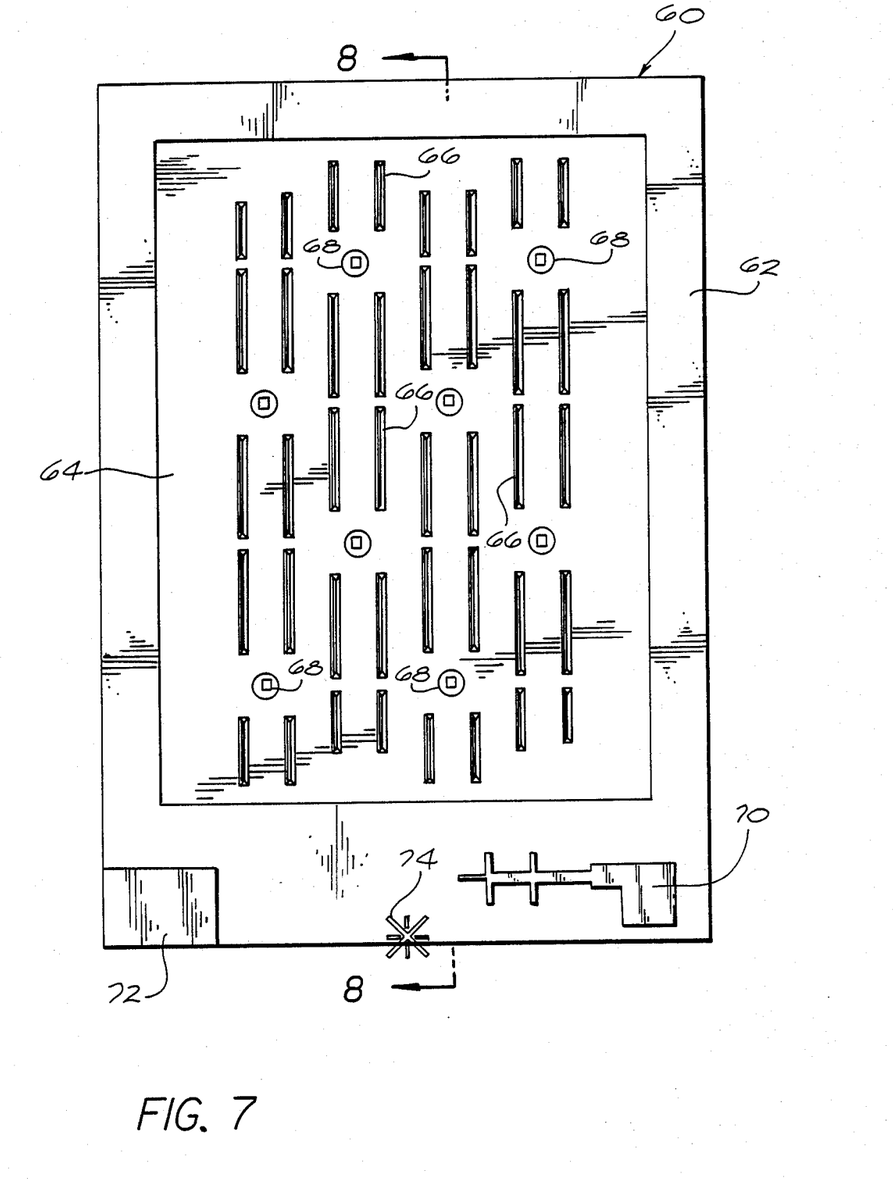
FIG. 7 a plan view of the top side of the base or lower fixed plate.

The upper surface of the lower fixed plate or base 60 as shown on FIG. 7 faces the bottom side of movable plate 10 and, as with lid 40, includes a rim of inlaid Pyrex 62 and a central portion 64 which contains a large number of grooves 66 and Pyrex stop spots 68 which are oxide coated to prevent anodic bonding to their points of contact on movable mass 12. Grooves 66 aid in directing the flow of air through passages 16 from one side to the other of the central mass 12 in the same manner as do grooves 46. On one edge of the rim 62 is an electrode 70 of conducting material such as aluminum which is electrically isolated from base 60 and makes contact with the narrow bars 34 on extension 21 of member 10 (FIG. 2). When the plates are assembled the branches of contact 70 are pressed against bars 34 such that the electrical potential of core member 10 and specifically of movable capacitor plate 12 appears on contact 70 which is wired to an outside circuit. A second contact 72 is in electrical contact with the silicon material of base 60 and carries the electrical potential of base 60. FIG. 7 also shows a star shaped assembly target member 74 which actually extends somewhat beyond the ultimate dimensions of base 60, but which appears as shown prior to trimming. This target is seen through the tapered viewing hole 24 of FIGS. 1 and 2 when core member 10 is stacked on base 60.

FIG. 8 is a sectional view taken along line 8—8 of FIG. 7. This view shows the thickness of base 60 and the Pyrex inlay of rim 62 as well as grooves 66 and the Pyrex stop spots 68.

Figure 9:
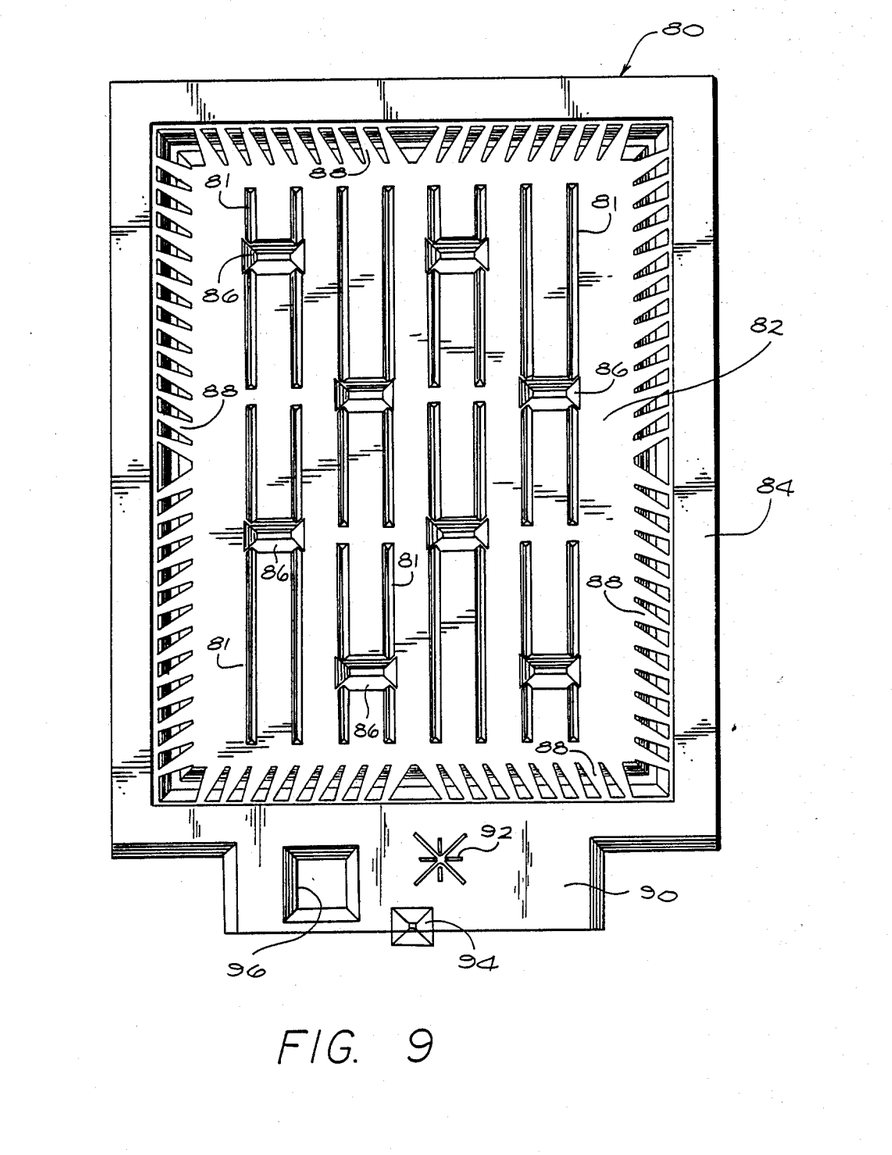
FIG. 9 is a plan view of one side of a movable capacitor plate used in alternate form of the invention.

FIG. 9 is a plan view of one side of a movable capacitor plate 80 which is somewhat modified from that shown in FIG. 1. In this view all the parts are the same as in FIG. 1 except that the grooves 81 for the passage of air are formed in the surface of the movable mass 82 so that they communicate directly with air passages 86. Such a plate may be used when the lid members 40 and 60 are formed without the grooves 46. The movable mass 82 is suspended from rim 84 by means of fingers 88 which are the same as fingers 18 and formed in the same way. This embodiment also includes an extension 90 including a target pattern 92, a tapered viewing hole 94 and the opening 96. The opposite side of this member may be the same as FIG. 2, but including similar grooves 81.

Figure 10:
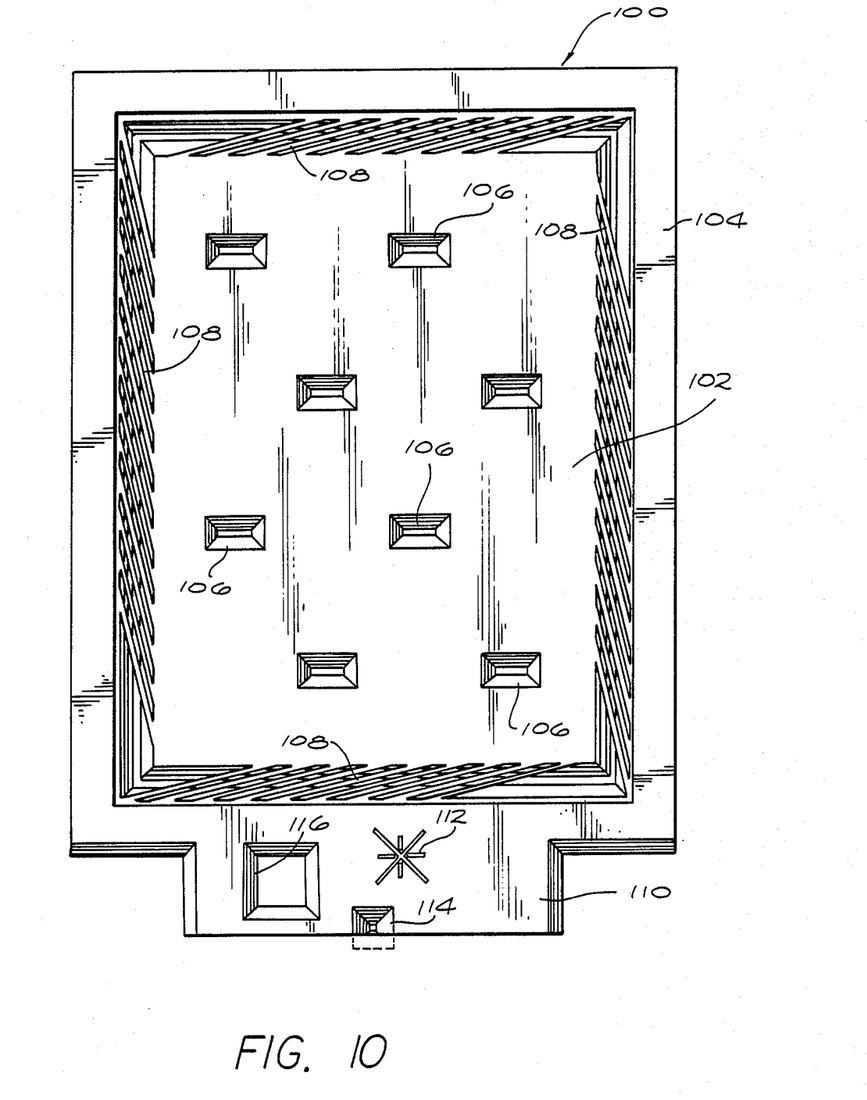
FIG. 10 is a plan view of one side of a movable capacitor plate constituting second alternate form of the invention.
Figure 11:
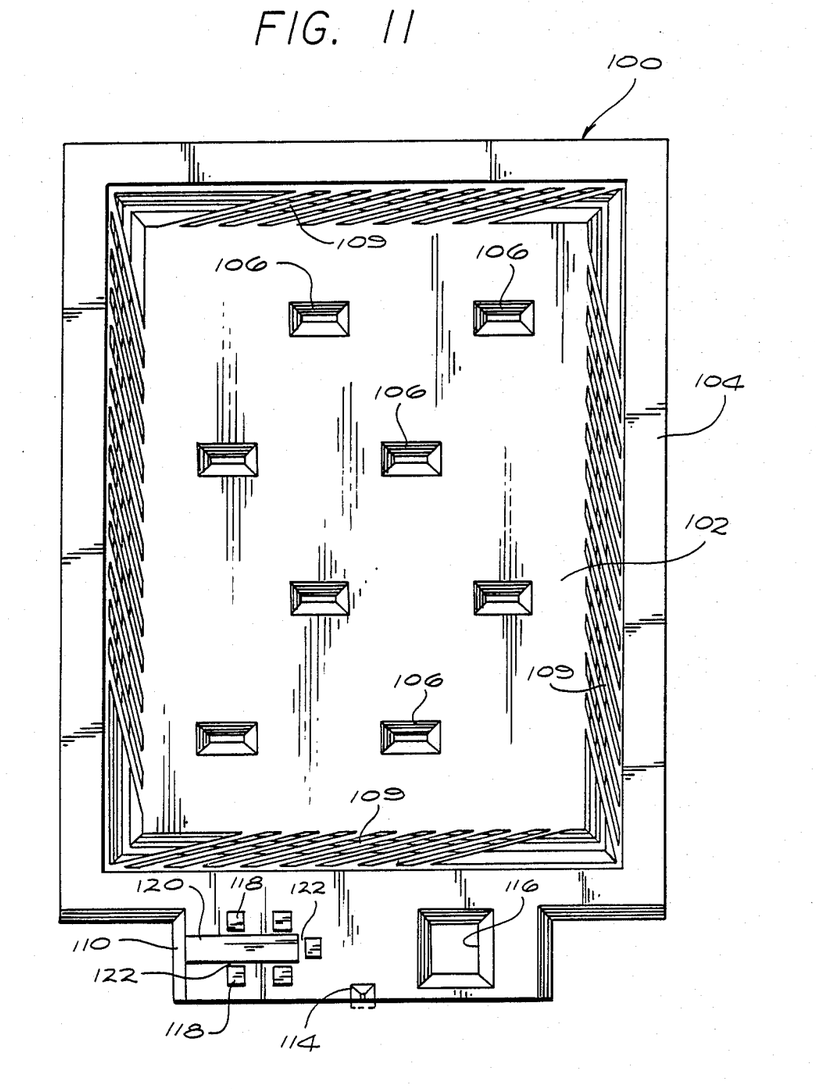
FIG. 11 is a plan view of the opposite side of the plate of FIG. 10.

In some applications it may be desired to have a movable capacitor plate which is somewhat more compliant than those thus far described. The embodiment shown in FIGS. 10 and 11 is very similar to that of FIGS. 1 and 2, but the movable capacitor plate 100 differs in that central mass 102 is suspended from rim 104 by means of a somewhat smaller number of narrow diagonal fingers 108 which are of approximately uniform width rather than tapered. This embodiment incorporates the through passages 106 for the passage of air and, as shown, would be assembled with a lid and base having grooves as shown in FIGS. 4 and 7, respectively. This arrangement leaves a larger area of openings for the passage of air at the corners. More reduction in damping is provided by more and larger grooves 46 and 66. It will be appreciated that the damping restriction is less than in the FIG. 1 embodiment because the fingers 108 are more compliant than are fingers 18 and also because the openings for the passage of air are somewhat greater. This embodiment includes other features as previously described including the extension 110, the target 112, the tapered viewing hole 114 and the opening 116, which are directly analogous to components 21, 22 24 and 26 of FIG. 1.

FIG. 11 shows the bottom side of movable capacitor plate 100 which is identical to that of FIG. 2 except that it shows the more compliant fingers 109 in place of the tapered fingers 20. Thus the central mass 102 is suspended from each edge by the fingers 108 and 109 in the same manner as central mass 12 is suspended by fingers 18 and 20. The rectangular depressions 118 and 120 provide narrow bars 122 in the surface of extension 110 which make contact with contact member 70 (FIG. 7) as described above to provide the electrical output from plate 100.

Figure 12A:
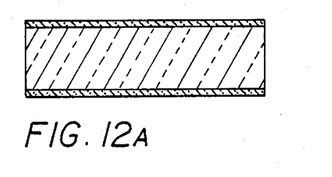
FIGS. 12a–12k are fragmentary sectional drawings indicating the processing sequences for producing the movable capacitor plate of FIGS. 1, 2 and 3.
Figure 12B:
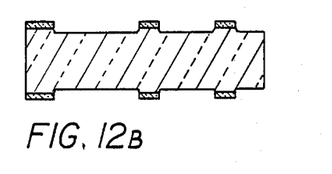
Figure 12C:
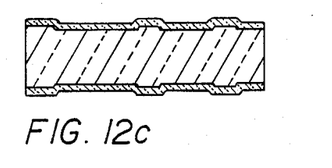
Figure 12D:
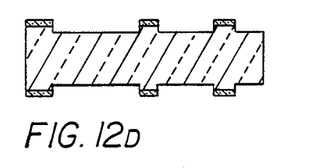
Figure 12E:
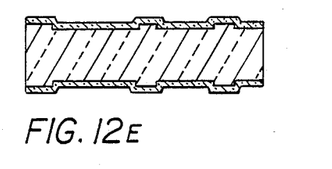
Figure 12F:
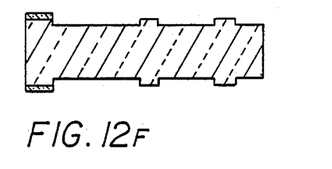
Figure 12G:
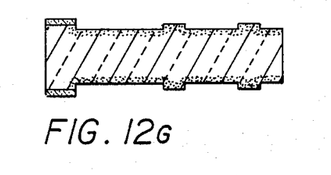
Figure 12H:
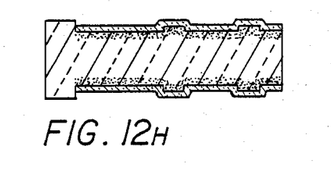

As purely illustrative of a process for achieving the desired results, and particularly in the production of the central movable plate of the sandwich structure of the invention, the starting material is a single crystal silicon wafer P type (100) plane indexed [110] within 0.7 degrees. The initial thickness is selected to be 0.0050 inches ±0.0002 inches. Both sides are polished and then oxidized lightly to about 0.3 microns thickness. The process for creating the central movable plate structure 10 is illustrated in FIGS. 12a–12k. The initial procedure described above is shown in FIG. 12a. Photo resist material is applied to the front and back oxide coats and the wafer is then subjected to a buffered oxide etch which removes the oxide except where protected and a caustic etch which serves as a leveling silicon etch, etching into the silicon approximately 1.2 microns. The resulting structure is shown in FIG. 12b. The protected oxide is then removed and the entire surface is again re-oxidized as shown in FIG. 12c. An additional etching step is indicated in FIG. 12d wherein a positive photoresistant chemical is again applied and the oxide again etched away except for the protected pattern. Again, the oxide is stripped away and the entire wafer re-oxidized at 1070 degrees C. one hour in a wet environment. This structure is shown in FIG. 12e. FIG. 12f shows the structure resulting from a further etching process in which, again, both sides are protected by means of a photo-resist material and the unprotected surface subjected to a buffered oxide etch through the oxide and a caustic "leveling" etch into the silicon layer to 1.93 microns such that the silicon surface is recessed to 4.33 microns ±0.015 total. The primary purpose of this last etching process is to reduce the height of the stop bumps to a desired amount. If these stop bumps are not formed on the movable mass 12 then this step is not necessary. FIG. 12g indicates a process in which both sides of the wafer are doped with boron to a concentration in excess of $5 \times 10^{19}$ atoms/cc. to an etch-resistant depth with a thickness of about 2.4 microns.

Figure 12I:
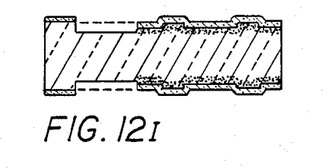
Figure 12J:
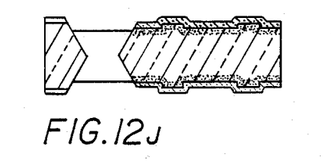
Figure 12K:
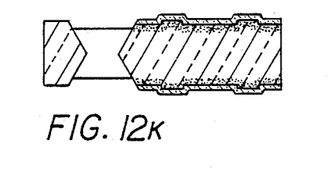

Following the doping process there is always produced an oxide layer which it is necessary to remove. This layer is removed and the wafer again re-oxidized at 1030 degrees C. for 20 minutes. Both sides are then further coated with a resist and etched again. The wafer is again re-oxidized in a wet atmosphere at 990 degrees for approximately 10 minutes to provide a smaller layer of oxide. Referring now to FIG. 12i, both sides are masked as desired to produce the desired patterns and the wafer subjected to reaction in ionized low-pressure gas which can preferentially etch through oxide or silicon and, in that part of the wafer where the leaf springs are to be formed, the etch extends approximately 3 microns to the silicon on both sides. In this manner, both the oxide and part of the silicon are removed. In a subsequent step, FIG. 12j, a selective etchant is applied from both sides to etch entirely through the wafer except for those parts which are protected by the boron dopant material. This produces the fingers 18 and 20 shown in FIGS. 1 and 2. The remaining step, as shown in FIG. 12k, is a controlled etching of limited time and which leaves a limited layer of boron oxide.

Figure 13A:
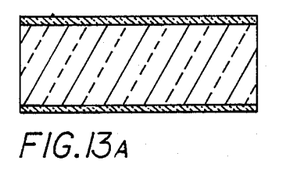
FIGS. 13a–13i are fragmentary sectional drawings showing processing sequences for producing the lid of FIGS. 4, 5 and 6.
Figure 13B:
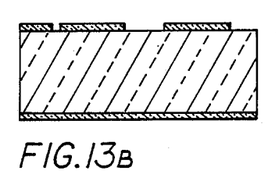
Figure 13C:
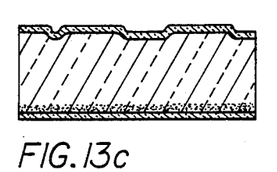
Figure 13D:
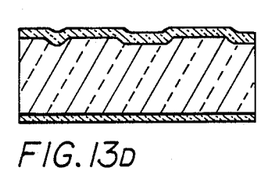
Figure 13E:
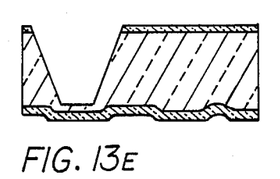
Figure 13F:
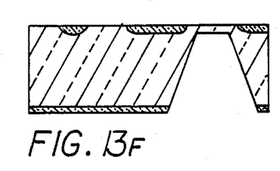
Figure 13G:
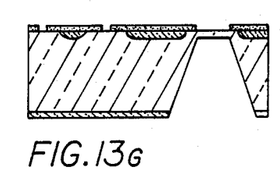
Figure 13H:
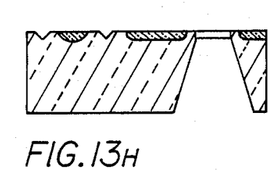
Figure 13I:
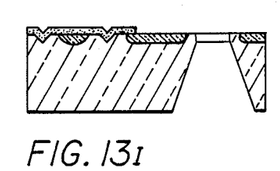
Figure 13J:
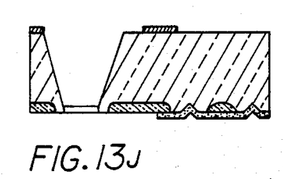

Producing the lid member shown in FIGS. 4, 5 and 6 is accomplished by processes similar to those discussed above. The individual steps are shown in FIGS. 13a–13j. A similar single-crystal silicon wafer P-type (100) indexed (110) within 0.5 degrees is provided with an initial thickness of 0.012 inches ±0.0003 inches. Both sides of this wafer are polished and then coated with oxide layers. This is the configuration shown in FIG. 13a. This wafer is then given a positive resist on both sides through desired masks and subjected to an etching step with desired patterns being masked from the etching. The wafer is then subjected to a heavy oxide process for four hours at 1070 degrees C. in a wet environment. After suitable masking, the wafer is again subjected to an etching step and inspection, and any oxide not removed where desired is manually scraped away. This leaves the wafer as shown in FIG. 13b. The next step shown in FIG. 13c involves an acid etch to recess the unprotected silicon 1.6 to 2.0 mils. An oxide etch follows to remove any overhanging oxide, after which an additional oxidation step is performed at 1070 degrees C. in a wet environment for one hour. Following this, a deposit of 2 mils of 7070 Pyrex glass is deposited on one side as shown in FIG. 12d. FIG. 13e shows the wafer inverted and in this step a positive resist with a suitable mask is provided after which the wafer is subjected to a buffered oxide etch to remove the oxide from the area where it is desired to etch deeply. The wafer is then subjected to a selective etchant to etch the deep groove shown in FIG. 13e leaving approximately 1.5 mil of silicon at the bottom of the groove. FIG. 13f shows the wafer again inverted and in this step the Pyrex layer is polished to a level where it effectively provides a flat surface with the silicon base. The wafer is then cleaned with sulfuric acid and subjected to a high-temperature burn-off as a further cleaning operation. As shown in FIG. 13g, a layer of aluminum of approximately 1 mil thickness is evaporated on the surface of the wafer where desired, which is then treated with a positive photo resist material. This surface is then exposed with one or more masks in order to pattern the aluminum as desired. The wafer is then subjected to a selective etching to create the grooves having sharp bottoms shown in FIG. 13h which may be the grooves 46 as shown in FIG. 4. This etchant is permitted to continue entirely through the 1.5 mil groove bottoms from the previous etching step to produce features such as the corners 50 and 52 and the throughhole 56 used for alignment. In the next step the Pyrex face material is protected, the oxide is removed from the opposite side and the aluminum is stripped from the wafer. An additional mask having the desired pattern is then placed on the wafer and a very thin layer of silicon dioxide (5,000 angstroms) is deposited through the mask onto the surface of the wafer and the wafer is then heated at 520 degrees C. for 20 minutes to concentrate the SiO$_2$. FIG. 13j shows the wafer again inverted and on the top layer a deposit of 7/10ths micron of aluminum is placed on the wafer to provide electrical contacts. The wafer is again heated to 450 degrees C. for approximately 10 minutes to cause the aluminum to bond.

Figure 14A:
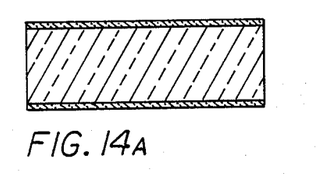
Figure 14B:
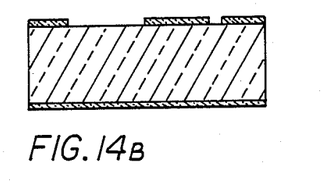
Figure 14C:
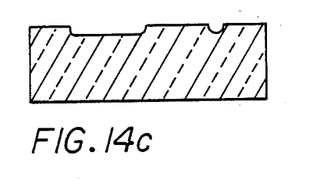
Figure 14D:
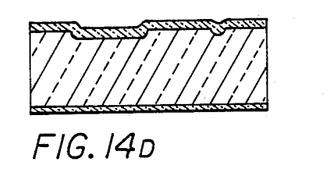
Figure 14E:
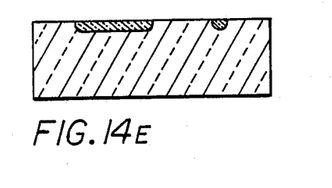
Figure 14F:
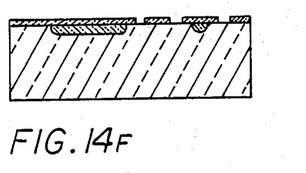
Figure 14G:
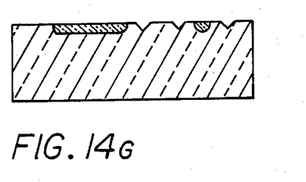
Figure 14H:
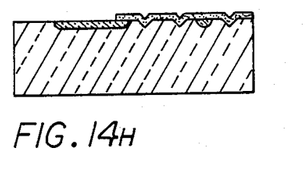
Figure 14I:
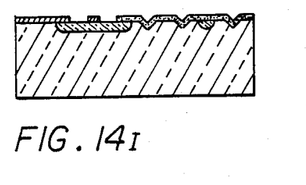

The process for producing the base member 60 shown in FIGS. 7 and 8 is described in connection with FIGS. 14a–14i. The process begins with a silicon wafer shown in FIG. 14a which is similar to that shown in FIG. 13a but with a thickness of 0.018 inches. In this case, however, only one side is polished and both sides are coated with a heavy oxide layer. A positive resist material is then applied through a desired mask and the back is protected. The rim is kept clear of the mask and the top surface is exposed to a buffered oxide etch as shown in FIG. 14b. The surface is then subjected to an acid etch to approximately 2 mils deep after which the oxide is stripped off and the top and bottom surfaces subjected to a new oxide coating by exposing the wafer to 1070 degrees C. for one hour in a wet environment. Following this, a 2.0 mil deposit of 7070 Pyrex is applied to the top surface. This is shown in FIG. 14d. FIG. 14e shows the oxide etched from the back such that the back is cleaned flat. The upper surface is polished such that the glass and silicon surfaces are level. The wafer is then cleaned with sulfuric acid and subjected to a 440 degree C. burn-off as a further cleaning step. In FIG. 14f is shown a one micron layer of aluminum evaporated onto the surface of the wafer which is then given a positive resist layer through a desired mask leaving specific openings such as those for the grooves 66. In FIG. 14g is shown that the following selective etching process has produced grooves to sharp bottoms. The aluminum is then stripped away and the surface is dried at 440 degrees C. for 20 minutes. An additional mask is used for the next step through which is provided a deposit of silicon dioxide of approximately 5,000 angstroms thickness after which the wafer is heated at 520 degrees C. for 20 minutes. FIG. 14i shows an additional deposit of aluminum of 0.5 microns thickness (±0.15 microns). A positive resist is then placed on the wafer through a desired mask and the extra aluminum removed to provide the desired electrical contact. The wafer is then heated at 450 degrees C. for about 10 minutes to cause the aluminum to bond securely to the silicon.

Following the above, the layers are bonded together, preferably by means of anodic bonding.

From the foregoing it will be understood that the applicant has provided a differential variable capacitance acceleration sensor which has a number of advantages over the single variable capacitance sensor used in pairs. In addition to being more economical to fabricate, it is more economical of space and introduces only a single frequency response into the system. Supporting the movable mass in two planes provides a more stable, wobble-free structure. The additional space between the fingers relieves any top-to-bottom breathing problem which might occur with the single variable capacitor.

While a limited number of embodiments have been described herein, it will be recognized that modifications may be made within the scope of the present invention. While it is preferable to make the outer layers of silicon, as described, they may also be fabricated of Pyrex glass, in which case the opposing surfaces facing the movable capacitor plate will preferably be coated with a thin metallic layer such as aluminum to provide the opposing capacitor plates. Suitable feedthrough connectors must be provided from the aluminum plates. Although embodiments have been described with grooves for air passages on faces of the lid or base adjacent the core, it will be apparent that, depending upon the stiffness or response characteristics desired, the grooves might be on either set of opposing surfaces. The stop spots may be formed on either the movable mass or opposing faces of the lid and base. And while the suspending fingers are described as having specific shapes, it is recognized that one having need for a particular response characteristic might fashion the fingers of a somewhat different shape. Other modifications will occur to those skilled in the art.

I claim:

1. A differential variable capacitance transducer including a laminate of three layers, an inner plate layer, a first outer plate layer and a second outer layer of substantially the same size;

said inner plate layer being essentially of monocrystalline silicon, and said outer layers being of material having thermal expansion properties substantially the same as silicon;

a rim forming the periphery of each of said outer plate layers, said rim having a borosilicate glass inlay bonded thereto to insulate said inner plate layer from said first and second outer layers;

a central seismic mass on said inner plate forming the moving capacitive plate of said transducer and having a first and a second face, said mass spaced on each side edge from said rim;

a large number of leaf springs which are atomically continuous with said mass extending from both top and bottom edges of said mass to top and bottom edges of said rim, said seismic mass being supported on said leaf springs for movement in a plane normal to the plane of said plate;

a plurality of holes formed in said seismic mass forming fluid communication between said first and second faces of said mass;

a plurality of grooves formed in at least one of said seismic mass and said opposed surfaces of said first and second outer plate layers extending from near at least some of said holes to points spaced from said holes;

said outer layers and said rim forming a cavity for said seismic mass and a gas in said cavity; and cooperating electrical contact means on said plate and said outer layers for transmitting the output of said transducer.

2. A capacitive transducer as claimed in claim 1 further including a plurality of spaced dielectric projections extending from opposing faces of said outer plate layers for engaging said seismic mass.

3. A differential variable capacitance transducer as claimed in claim 1 wherein one of said outer plates includes a first electrical contact member communicating with the silicon material thereof and a second electrical contact member on said borosilicate glass rim insulated from the silicon material of said one outer plate, and said rim of said inner plate includes spaced contact members in contact with said second electrical contact member.

4. A differential variable capacitance transducer as claimed in claim 1 wherein said central mass includes a plurality of grooves communicating with said holes.

5. A differential variable capacitance transducer as claimed in claim 1 wherein said grooves are formed in the opposed surfaces of said outer plate layers.

6. A differential variable capacitance transducer as claimed in claim 1 wherein the one of said outer plate layers includes an electrical contact member and corners which are etched away to the level of said inlay of borosilicate glass.

7. A differential variable capacitance transducer as claimed in claim 1 wherein a plurality of dielectric stop members are formed in the opposing surfaces of said outer plate layers, said stop members extending above said surfaces an amount which is greater than the height of said borosilicate glass rims.

8. A differential variable capacitance transducer as claimed in claim 7 wherein said stop spots are inlays of borosilicate glass.

9. A differential variable capacitance transducer as claimed in claim 8 wherein the contact spots on said control seismic mass are oxide coated to prevent anodic bonding to said stop spots.

10. A differential variable capacitance transducer including a laminate of three layers, an inner plate layer, a first outer plate layer and a second outer layer of substantially the same size;

said layers comprising plates formed essentially of monocrystalline silicon;

said inner plate layer including a rim and a central seismic mass forming the moving capacitive plate of said transducer having a first and a second face, said mass being spaced from said rim;

a large number of leaf springs which are atomically continuous with said mass extending from both top and bottom edges of said mass to top and bottom edges of said rim, said seismic mass being supported on said leaf springs for movement in a plane normal to the plane of said plate;

a plurality of holes formed in said seismic mass forming fluid communication between said first and second faces of said mass;

a plurality of grooves formed in said layers extending from near at least some of said holes to points spaced from said holes;

said outer layers and said rim forming a cavity for said seismic mass and a gas in said cavity, said outer layers each having a rim of borosilicate glass insulating said outer layers from the rim of said inner plate layer; and cooperating electrical contact means on said plate and said outer layers for transmitting the output of said transducer.

11. A differential variable capacitance transducer as claimed in claim 10 wherein said leaf springs are formed substantially wider at their inner end where they are connected to said seismic mass than at their outer end.

12. A differential variable capacitance transducer as claimed in claim 10 wherein said leaf springs comprise a plurality of narrow members of substantially uniform width extending at an angle from each side edge of said seismic mass to the top and bottom edges of said inner plate rim.

13. A differential variable capacitance transducer as claimed in claim 10 wherein said central mass includes a plurality of grooves communicating with said holes.

14. A differential variable capacitance transducer as claimed in claim 10 wherein said grooves are formed in the opposed surfaces of said outer plate layers.

15. A differential variable capacitance transducer as claimed in claim 10 wherein the dimensions of said grooves and said holes are controlled to control the frequency response of said transducer.

16. A differential variable capacitance transducer as claimed in claim 10 wherein a plurality of dielectric stop members are formed in the opposing surfaces of said outer plate layers, said stop members extending above said surfaces an amount which is greater than the height of said borosilicate glass rims.

17. A differential variable capacitance transducer characterized by:

(a) a laminate comprised of three layers, an inner plate layer, a first outer layer and a second outer layer of substantially the same size;

(b) each of said three layers comprised of monocrystalline silicon;
(c) each of said first and second outer layers insulated from said inner plate layer;
(d) a rim forming the periphery of said inner plate;
(e) each of said outer layers joined and sealed at the periphery thereof to one side of said plate rim;
(f) a central seismic mass on said plate forming the movable capacitive plate of said apparatus and having a first and a second face, and said mass spaced on each side edge from said rim;
(g) a large number of leaf springs which are atomically continuous with said mass extending from both top and bottom edges of said mass to top and bottom edges of said rim, said mass being supported on said leaf springs for movement in a plane normal to the plane of said inner plate;
(h) at least one hole formed in said seismic mass for forming fluid communication between said first and second face of said mass;
(i) a plurality of grooves formed in said first and second outer plate layers, said grooves extending from near said hole to points spaced from said hole;
(j) said outer layers and said rim forming a cavity for containing a gas therein; and
(k) cooperating electrical contact means on said plate and at least one of said outer layers for transmitting the measured stimuli of said apparatus.

18. A differential variable capacitance transducer as claimed in claim 17 wherein each of said outer plates includes a rim of inlaid borosilicate glass providing physical contact with the rim of said inner plate but electrically insulating said inner plate from said outer plates.

19. A differential variable capacitance transducer as claimed in claim 17 wherein a plurality of dielectric stop members are formed in opposing surfaces of each of said outer plate layers, said stop members extending toward each face of said movable capacitive plates.

20. A process for producing a differential variable capacitance transducer comprising the steps of:
(1) selecting an inner plate layer, a lid layer and a base layer of P-type monocrystalline silicon;
(2) polishing and oxide coating both sides of said inner and lid layers and one side of said base layer;
(3) protecting the desired pattern on both sides of said inner layer with photo-resist material and etching both sides to a desired depth;
(4) stripping the oxide, reoxidizing and re-etching both sides of said inner layer;
(5) depositing on both sides of said inner layer a dopant of boron to an etch resistant depth of a least approximately 2.4 microns;
(6) removing doping oxide from said inner layer, reoxidizing said inner layer and protecting both sides with positive photo-resist material in a desired pattern;
(7) protecting both sides with a mask and etching through the oxide layer to a depth at least approximately three microns into the silicon;
(8) etching selectively for both orientation and doping entirely through parts of said inner layer not protected by boron or mask to form fingers suspending a central mass from the rim of said inner plate;
(9) protecting both sides of said lid with photo-resist material and etching and acid etching on the side to be adjacent said inner layer;
(10) stripping the oxide, reoxidizing and depositing borosilicate glass where etched on said lid on the side to be adjacent said inner layer;
(11) protecting the opposite side of said lid with photo-resist material in a desired pattern and etching deep leaving approximately 1.5 mil silicon;
(12) polishing the borosilicate glass and silicon side of said lid to a smooth surface, cleaning and evaporating an aluminum layer, protecting with a positive photo-resist and masking as desired;
(13) etching through said aluminum layer as desired;
(14) protecting said borosilicate glass and stripping oxide and aluminum from the opposite side of said lid;
(15) depositing through a mask on the borosilicate glass side of said lid a layer of $SiO_2$ and heat to 520 degrees C. for appxoimately 20 minutes;
(16) depositing a layer of aluminum on the top side of said lid to provide electrical connections;
(17) applying a photo-resist material to the top side, patterning said aluminum layer and heating to bond said aluminum layer to said silicon;
(18) applying photo-resist to the upper side of said base through a mask, protecting the back side, and etching the top side;
(19) acid etching to a significant depth such as two mils and stripping oxide from both sides of said base;
(20) applying a heavy coat of oxide and depositing borosilicate glass on the top side of said base;
(21) etching the oxide from the back and polishing the borosilicate glass and silicon to provide a smooth surface;
(22) depositing a layer of $SiO_2$ through a mask and heating said base at approximately 520 degrees C. for about 20 minutes;
(23) cleaning and evaporating aluminum through a mask, as desired, for electrical contacts and heating said base to bond said aluminum;
(24) and bonding said layers together.

21. A process for producing a differential variable capacitance transducer as claimed in claim 20 including etching through said inner layer to form throughholes therein during the same etching step wherein said fingers are formed.

22. A process for producing a differential variable capacitance transducer as claimed in claim 21 wherein following step (12) said etching step etches through said aluminum layer to form grooves in said lid communicating with said throughholes.

23. A process for producing a differential variable capacitance transducer as claimed in claim 20 wherein following step (9) the side of said lid opposite said inner layer is subjected to a dopant of boron.

24. A process for producing a differential variable capacitance transducer as claimed in claim 20 wherein following step (20) a layer of aluminum is deposited on the side of said base having the borosilicate glass layer and said base is subjected to an etching step to form grooves in said base communicating with said throughholes.

25. A process for producing a differential variable capacitance transducer as claimed in claim 20 wherein the bonding step (23) comprises anodic bonding.

* * * * *